Aug. 7, 1951         W. B. SMITS         2,563,625
ELECTRIC IGNITION APPARATUS
Filed Nov. 6, 1948

Inventor
Wijtze Beye Smits
By Haseltine, Lake & Co.
Agents

Patented Aug. 7, 1951

2,563,625

UNITED STATES PATENT OFFICE 2,563,625

ELECTRIC IGNITION APPARATUS

Wijtze Beÿe Smits, Voorburg, Netherlands, assignor to Smitsvonk N. V., The Hague, Netherlands Application November 6, 1948, Serial No. 58,703
In the Netherlands September 22, 1948

4 Claims. (Cl. 175—115)

My co-pending patent application Serial Number 49,545, now Patent No. 2,550,875, relates to an electric ignition apparatus, particularly adapted for use in a burner and comprising a surface discharge spark-plug, a condenser system and a contacting device, in which said spark-plug has, on its active surface, a chamber or recess which is open to the outside and is meant for the accumulation of fuel, e. g. mineral oil, and in which at least two sparks are produced in rapid succession on the surface of the spark-plug by means of the condenser system and the contacting device. The present invention has for its object to obtain with the aid of such an ignition apparatus a relatively very long and thin flame or a flame of big volume. This object is attained by the provision of a surface discharge spark-plug of the above mentioned type but having a second chamber or recess in its active surface, said second chamber or recess opening to the outside near the first mentioned chamber or recess, in such a manner, that fuel driven out of said first mentioned chamber or recess has an ejecting action on the contents of the second chamber or recess.

The chambers of the spark-plug are filled with fuel before the ignition apparatus is put into operation. The spark plug may be so placed in the tube of a fuel burner that it collects the fuel supplied to said tube. The first spark produced after the ignition apparatus has been put into operation drives the fuel contained in the first chamber with force out of said chamber. The next spark ignites said fuel. The cloud of fuel which moves rapidly away from the spark-plug by the explosion sucks the fuel out of the second chamber to the outside, so that said cloud, that means the flame, will be considerably enlarged. Since the sparks themselves effect the supply of fuel to the igniting flame this supply always occurs at the right moment. If the fuel for the igniting flame were to be injected separately the right timing of the injection would be very difficult to obtain.

Preferably the second chamber in the spark-plug has an annular shape and surrounds the first mentioned chamber. It then opens to the outside by means of an annular gap.

It is not necessary, that the spark-plug collects the fuel from the surroundings. The fuel may also be supplied to the second chamber through a conduit. This supply may be controlled automatically during the occurrence of the igniting flame.

The two chambers in the spark-plug may communicate with one another near their bottoms by means of one or more passages. In that case the pressure produced in the first chamber during the explosion drives the liquid out of the second chamber. In order that this expulsion takes place gradually at a certain interval after the generation of the first spark said passages must be made so narrow that they exert a throttling effect. By means of the passages interconnecing both chambers the latter may be simultaneously supplied with fuel through the fuel supply conduit which opens into the second chamber.

For the elucidation of the invention reference is made to the accompanying drawing illustrating by way of example several embodiments of a spark-plug for use in combination with the ignition apparatus as described in the co-pending patent application Serial Number 49,545. In the drawing.

Figure 1:
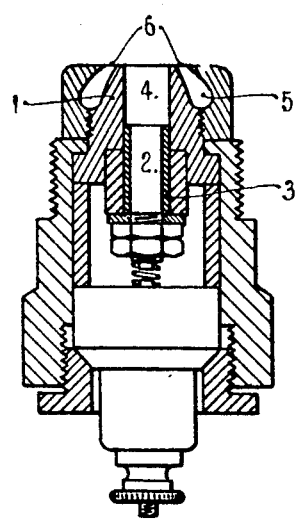
Fig. 1 is a longitudinal sectional view of such a spark-plug.

The illustrated spark-plugs are each provided with an annular outer-electrode 1, a central inner-electrode 2 and an insulating or semi-conductive member 3 separating said electrodes. The sparks occur as surface discharge sparks on the end surface of the separating member 3. The central electrode 2 and the separating member 3 end some distance beneath the end face of the annular outer-electrode 1, so that a recess 4 is formed. In all embodiments fuel injected into the combustion space of a burner or like device is collected in said recess 4. In the outer-electrode 1 and the outer part of the spark-plug an annular chamber 5 surrounding the recess 4 is provided. Said chamber 5 opens to the outside by means of an annular gap 6 near the opening of recess 4. In the embodiments as shown in Figs. 1 and 3 this annular chamber 5 also collects fuel which is injected into the burner or like device. In the variant illustrated in Fig. 2 fuel can be supplied to chamber 5 through a conduit 7.

The first spark produced in the recess 4 drives the fuel out of said recess with such a force, that the fuel will be atomized. The cloud of fuel moves rapidly away from the spark-plug and exerts a sucking force on the fuel contained in the annular chamber 5, so that this fuel is also driven out of the spark-plug and the cloud will considerably grow. By means of the next spark or sparks said cloud of atomized fuel is ignited, thus causing a flame of big volume and great intensity for the ignition of the burner or like device. The shape of the flame can be adapted to existing conditions by giving the chambers 4 and 5 the right shapes.

In the embodiment as shown in Fig. 3 the recesses or chambers 4 and 5 are interconnected near their bottoms by means of passages 8. These passages have the object to convey the pressure produced in recess 4 by the sparks to chamber 5 in order to drive the liquid out of the latter. This increase of pressure in chamber 5 increases the effect of the ejecting action of the fuel blown out of recess 4. The passages 8 must be narrow in order to obtain a throttling action since the fuel must be gradually driven out of chamber 5. Only in that case a very explosive cloud of big volume will be obtained, said cloud producing a big intensive flame by its ignition.

Figure 2:
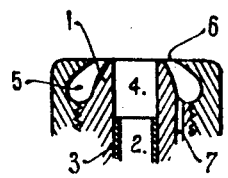
Fig. 2 is a sectional view of the active end portion of a spark-plug which has a slightly different shape.
Figure 3:
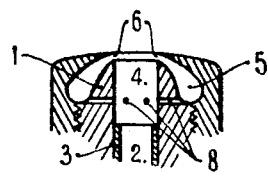
Fig. 3 shows a sectional view of the active end portion of still another spark-plug.

The embodiments according to Figs. 2 and 3 may be combined. It is also possible to use more than one auxiliary chamber or recess in the spark-plug.

What I claim is:

1. A surface discharge spark plug comprising, in combination, a body having at least two recesses having closely adjacent openings and constituting a fuel ejecting device, at least two electrodes and a member of at most semi-conductive material separating said electrodes and having, between the electrodes, an exposed end face across which the sparks sweep, said electrodes and said separating member being supported by said body and the end faces of said separating member and at least one electrode forming the bottom of one of said recesses, said ejecting device being operative when fuel caught by the recess at the bottom of which the sparks are produced is ejected by the action of said sparks, the ejection of said fuel causing also fuel contained in the other recess to be driven out.

2. A surface discharge spark-plug as claimed in claim 1 wherein one of the recesses is of annular shape surrounding the other recess, the bottom of said inner recess being formed by said electrode and the end face of said member, said annular recess having an annular opening closely surrounding the aperture of the other recess.

3. In a surface discharge spark-plug as claimed in claim 1 a fuel supply conduit leading to said other recess.

4. In a surface discharge spark-plug as claimed in claim 1 at least one communicating passage connecting the recesses to each other adjacent the bottom thereof.

WIJTZE BEŸE SMITS.

REFERENCES CITED

The following references are of record in the file of this patent:

UNITED STATES PATENTS

| Number | Name | Date |
|---|---|---|
| 1,905,957 | Anderson | Apr. 25, 1933 |
| 2,403,860 | Heath | July 9, 1946 |

FOREIGN PATENTS

| Number | Country | Date |
|---|---|---|
| 345,676 | Italy | Jan. 17, 1937 |
| 215,199 | Switzerland | Sept. 1, 1941 |
| 873,716 | France | July 17, 1942 |